United States Patent [19]

Deux et al.

[11] Patent Number: 4,707,973
[45] Date of Patent: Nov. 24, 1987

[54] METHOD FOR HARVESTING FRUIT, BERRIES AND THE LIKE, IN PARTICULAR FOR GATHERING GRAPES IN WHOLE BUNCHES

[75] Inventors: Alain Deux, Angers; Jean-Camille Merant, Doue la Fontaine; François Gibert, Civens; Antoine Berger, la Rochelle la Moliere, all of France

[73] Assignees: Braud, Société Anonyme; Tecmachine, Société Anonyme, both of France

[21] Appl. No.: 855,456

[22] Filed: Apr. 24, 1986

[30] Foreign Application Priority Data

Apr. 30, 1985 [FR] France .................. 85 06544

[51] Int. Cl.$^4$ .................................. A01D 46/28
[52] U.S. Cl. ........................... 56/328 R; 56/328 TS
[58] Field of Search .......... 56/328 R, 328 TS, 330, 56/DIG. 2

[56] References Cited

U.S. PATENT DOCUMENTS

| 4,250,700 | 2/1981 | Horn et al. | 56/328 TS |
| 4,418,521 | 12/1983 | Orlando et al. | 56/330 |
| 4,432,190 | 2/1984 | Orlando | 56/328 TS |

FOREIGN PATENT DOCUMENTS 880327  11/1981  U.S.S.R. .................. 56/328 TS

Primary Examiner—Stephen J. Novosad
Assistant Examiner—Bruce M. Kisliuk

[57] ABSTRACT

In a method for harvesting fruits, berries and the like by means of shaker members and in particular for gathering grapes in whole bunches, the shaker members are subjected to a succession of motion stages comprising a high-speed stage, a practically zero speed stage at least at one end of travel of the shaker members and an intermediate stage having a high speed gradient. The speed in the high-speed stage is at least 2 m/s, the time-duration of the practically zero speed stage is at least 30 ms and the speed gradient in the intermediate stage is at least 200 m/s$^2$.

8 Claims, 5 Drawing Figures

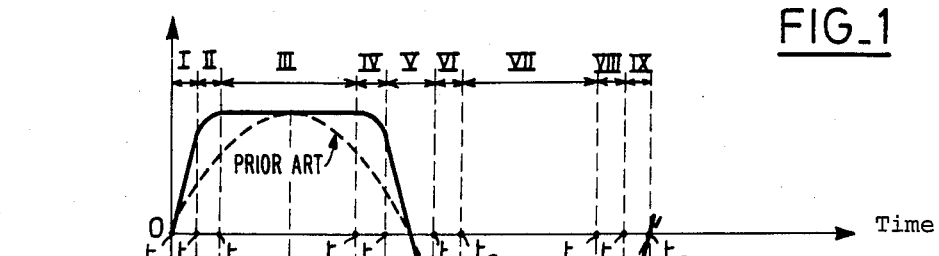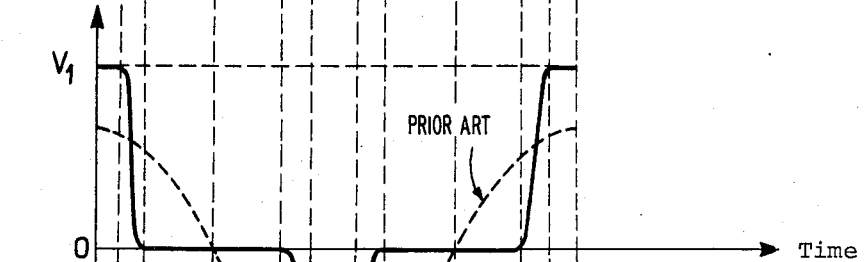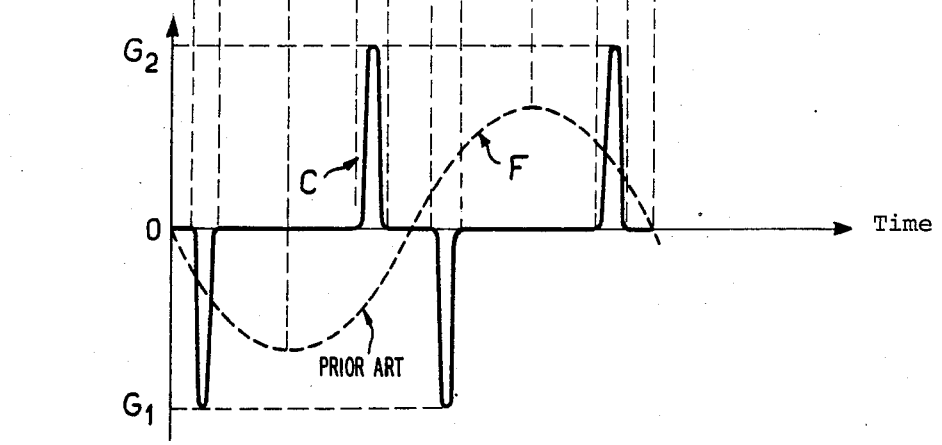
FIG_1

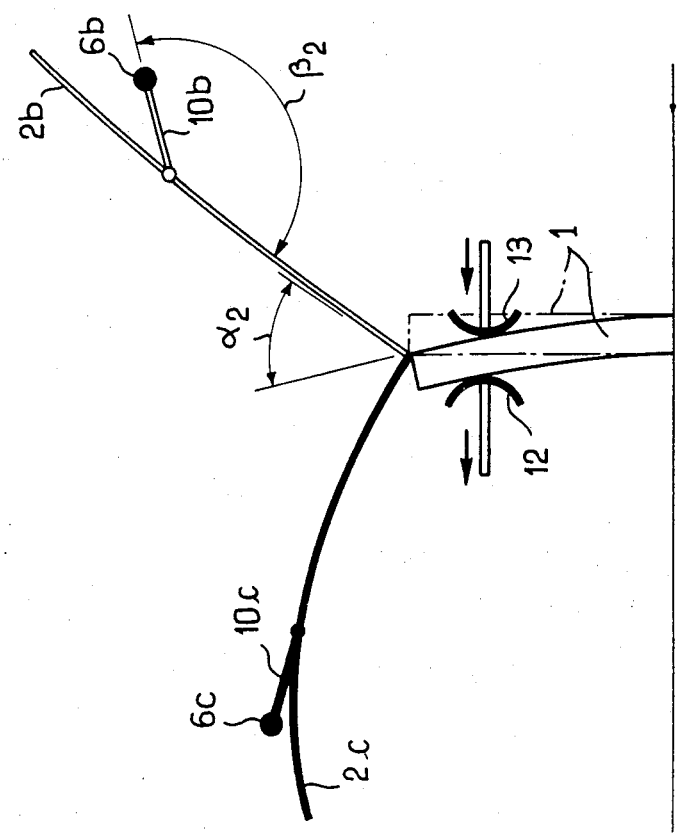
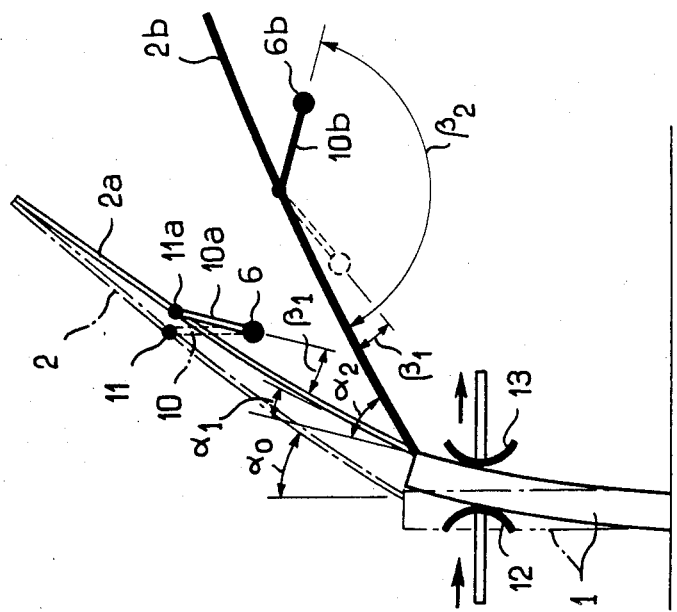

METHOD FOR HARVESTING FRUIT, BERRIES AND THE LIKE, IN PARTICULAR FOR GATHERING GRAPES IN WHOLE BUNCHES

BACKGROUND OF THE INVENTION

1. Field of the Invention

This invention relates to a method for harvesting fruits, berries and the like, in particular for gathering grapes in whole bunches. The method consists in shaking a plant bearing said fruits, berries and the like by means of shaker members which encompass the plant and are reciprocated between two end positions on each side of a mean position.

2. Description of the Prior Art

Harvesting machines equipped with shaker members driven in transverse reciprocating motion with respect to the direction of forward travel of the machine are now well-known (see for instance U.S. Pat. Nos. 3,667,202, 3,939,629, 4,198,801, 4,236,371, 4,286,426 and 4,391,085 and French Pat. Nos. 2,293,132, 2,509,955 and 2,516,742, although some of the machines disclosed in these patents use beater members instead of shaker members). In known machines of this type, the shaker members usually produce action on the plant within the fruit-bearing zone amidst the vegetation and subject the plant to a sinusoidal or pseudo-sinusoidal movement, the frequency and amplitude of which have the calculated effect of detaching the fruits. As a general rule, the movement is sinusoidal at the level of the drive mechanisms associated with the shaker members and pseudo-sinusoidal at the level of the plant by reason of the flexibility of the latter and also, in certain cases, by reason of the flexibility of the shaker members themselves. In all cases, this movement does not have any discontinuity either during shaking of a plant or during displacement of the machine from one plant to the next. The amplitude of motion (without taking into account the flexibility of the shaker members) is usually of the order of 100 mm (between 75 and 150 mm) and the shaking frequency is usually of the order of 8 cycles per second (between 6 and 10 cycles per second).

Although integral mechanical vintage or grape-harvesting is at present developing throughout the world for obvious economic reasons, a few technical difficulties still remain and tend to check its extension. In particular, the known grape-harvesting machines which are equipped with shaker members displaced in transverse reciprocating motion with respect to the direction of forward travel of the machine are attended by two disadvantages. In the first place, this mechanical action has the effect of bursting-open a relatively large number of individual grapes (called grape berries). In the second place, it has the effect of harvesting grape berries which have been detached from the bunches. These two phenomena give rise to a loss of juice, to difficulties in cleaning of the grapes owing to the number of vine leaves and to wetting of the leaves which are detached at the same time as the grapes. Further consequences include oenological problems which arise from the intimate contact of the released juice with the air and with foreign substances unrelated to the vintage, as well as vinification difficulties in certain particular cases (carbon dioxide maceration, fractional pressing). Furthermore, the shaker members tend to damage the plant itself and this is in turn liable to affect its health. As a mattter of fact, they have a tendency to produce leaf-stripping, breaking of vine-shoots which lead to difficulties in pruning, bud removal which is liable to have an adverse effect on the future yield of the plant, and injuries to the wood through which diseases may thus more readily gain entrance to the plant.

Observations made by the present Applicants by means of time-lapse cameras have in fact shown that detachment of grapes takes place after the plant has been shaked for a certain time, while giving rise to fatigue of the stems or other connecting organs which connect each "mass" (grape berries, bunches, foliage) to the remainder of the plant. Thus any failure of these connecting organs essentially takes place as a result of fatigue. During the period of time required for detachment of grapes, the bunches attached to small branches or flexible vine-shoots rotate in a random movement about their point of atttachment and the different berries of any one bunch or cluster bump against each other. The energy stored by these impacts finally causes detachment of the berries from the bunches. In consequence, when using the known machines equipped with shaker members which are driven in a sinusoidal or pseudo-sinusoidal movement, approximately 80% of the harvest consists of grape berries which have become detached from the bunches and only about 20% of the harvest consists of whole bunches. As they are detached from the bunches, the individual grape berries release juice as a result of opening of their skins. In addition, the powerful action of the shaker members in the fruit-bearing zone of the vine causes impacts between certain bunches and the shaker members. The grape berries thus burst open as a result of crushing and a substantial quantity of juice is released. Furthermore, the same powerful action of the shaker members in a portion of the plant foliage and branches produces a number of injuries including stripped or lacerated leaves, breakage of wood, removal of or injuries to shoots and buds as well as injuries to the wood.

In short, shaking of grapevines by means of shaker members driven in sinusoidal or pseudo-sinusoidal motion essentially results in detachment of grapes in the form of individual berries much more than in the form of whole bunches or clusters, releases large quantities of juice (impact upon grape clusters, detachment of grape berries) and injures the plant as a result of shock impacts on foliage and branches. The foregoing observations are also valid when these machines are employed for harvesting other fruits or berries such as, for example, red currants, black currants, gooseberries and, to some extent, raspberries.

SUMMARY OF THE INVENTION

The main object of the present invention is therefore to provide a method of shaking for harvesting fruits, berries and the like mostly in the form of whole bunches and for releasing a distinctly smaller quantity of juice than was the case with machines of the prior art in which the shaker members were driven in a sinusoidal or pseudo-sinusoidal movement. A subsidiary object of the invention is to provide a method of shaking for harvesting fruits, berries and the like, which causes less damage to harvested fruits as well as to plant foliage and branches.

To this end, the method of the present invention essentially consists in subjecting the shaker members during their displacement at least on one side of their mean position to a succession of motion stages comprising a high-speed motion stage, a practically zero-speed motion stage in one of the two end positions of the shaker members and, between these two stages, an intermediate stage of motion having a high speed gradient, the speed in the high-speed stage being at least equal to 2 meters per second, the time-duration of the practically zero speed stage being at least equal to 30 milliseconds and the speed gradient in the intermediate stage being at least equal to 200 meters per square second.

The intermediate stage having a high speed gradient can be either a deceleration stage which follows the high-speed stage or an acceleration stage which precedes the high-speed stage. Preferably, said succession of motion stages comprises in sequence a high-speed stage, a deceleration stage having a high speed gradient, a practically zero speed stage in said end position, an acceleration stage having a high speed gradient, and a high-speed stage. Furthermore, said succession of stages preferably takes place on both sides of the mean position of the shaker members. In other words, the law of motion of the shaker members is symmetrical with respect to their mean position. Moreover, although it is possible to cause the shaker members to operate on the fruit-bearing zone of the plants, they are preferably designed to produce action solely on the trunks of the plants. The result thereby achieved is that the shaker members are no longer liable to cause bursting-open and loss of juice of certain varieties of fruit or to cause injuries to plant foliage and branches (stripped or lacerated leaves, breakage of wood, breaking-off or injuries to shoots, injuries to the wood of plants) as a result of impacts on part of the fruit as well as on plant foliage and branches.

BRIEF DESCRIPTION OF THE DRAWINGS

Other features of the invention will be more apparent to those skilled in the art upon consideration of the following description and accompanying drawings, wherein:

FIG. 1 shows time-dependency diagrams relating to the motion of the shaker members in the method of the present invention and prior art;

FIGS. 3a to 3c are explanatory diagrams relating to the phenomena which, in the method of the present invention, lead to detachment of grapes in whole bunches.

DETAILED DESCRIPTION OF THE INVENTION

Figure 3A:
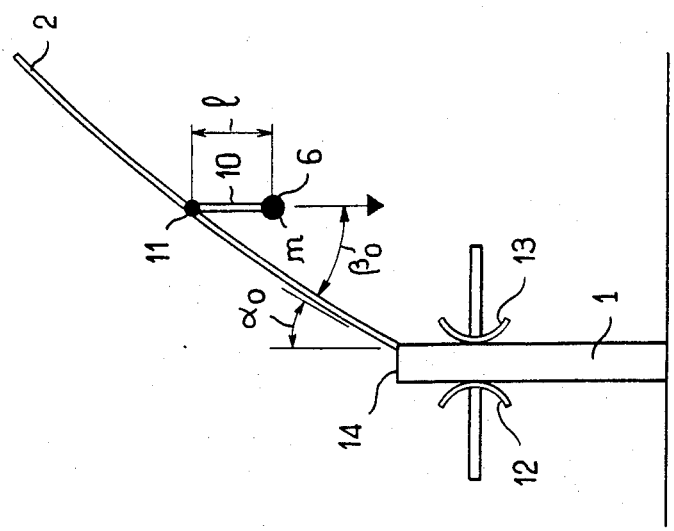

In FIG. 1, the solid-line curves A, B and C represent the time-dependent diagrams of movement, speed and acceleration respectively of the shaker members during one reciprocating-motion cycle of the method in accordance with the present invention. By way of comparison, FIG. 1 shows in dashed lines the diagram D of movement, the diagram E of speed and the diagram F of acceleration of the shaker members during one reciprocating-motion cycle in known machines.

In the method according to the invention, it is apparent from FIG. 1 that, starting from the mean position of the shaker members (instant $t_0$), the movement of said members during each reciprocating-motion cycle comprises successively a stage I at a high and substantially constant speed $V_1$ up to the instant $t_1$, then a deceleration stage II having a high speed gradient $G_1$ up to the instant $t_2$, then a stage III at zero or practically zero speed up to the instant $t_3$, then an acceleration stage IV having a high speed gradient $G_2$ up to the instant $t_4$, then a stage V at a high and substantially constant speed $V_2$ up to the instant $t_5$, then a deceleration stage VI at a high speed gradient $G_1$ up to the instant $t_6$, then a stage VII at zero or practically zero speed up to the instant $t_7$, then an acceleration stage VIII at a high speed gradient $G_2$ up to the instant $t_8$, then a stage IX at a high and substantially constant speed $V_1$ up to the instant $t_9$. After the instant $t_9$, a new cycle begins and takes place in a manner which is similar to the sequence just described. The speeds $V_1$ and $V_2$ can have the same absolute value or different absolute values. Likewise the speed gradients $G_1$ and $G_2$ (deceleration or acceleration) can have the same absolute value or different absolute values.

It will be noted that, at equal amplitudes and at equal repetition frequencies of the reciprocating motion, the maximum speeds $V_1$ and $V_2$ and the maximum speed gradients $G_1$ and $G_2$ are distinctly higher in the method of the present invention than in known machines. As will hereinafter become more clearly apparent, this establishes favorable conditions for detachment of grapes in whole bunches.

Experiments performed by the present Applicants have shown that good results for grape harvesting were obtained by adopting the following values:

(a) total stroke of the shaker members: approximately 100 mm;

(b) frequency of repetition of reciprocating motion: approximately 4 c/s (cycles per second);

(c) duration of each of the two stages III and VII, that is, duration of stopping times of the shaker members at each end of the stroke: approximately 100 milliseconds;

(d) speeds $V_1$ and $V_2$ during stages I, V and IX: approximately 5 meters per second;

(e) speed gradients $G_1$ and $G_2$ during stages II, IV, VI and VIII: approximately 1000 meters per square second.

With the above-indicated values, approximately 60 to 80% of the grape harvest consisted of whole bunches. It will readily be apparent that the values indicated above may vary according to the type of fruit to be harvested (grapes, black currants, red currants, gooseberries, and so on), according to the variety of fruit (that is to say according to the different species of vine in the case of grapes), according to the method of training of the plant (such as, for example, espalier-training, cordon-training, goblet-training and so on, in the case of grapevines) or according to a number of other factors. Experiments performed by the present Applicants in the case of grapevines have shown that good results could be obtained in regard to detachment of grapes in whole clusters when the following values are adopted :

frequency of repetition of reciprocating motion of shaker members: between 2 and 10 c/s (cycles per second);

amplitude of total stroke in reciprocating motion: between 50 and 150 mm;

stopping time of shaker members at each end of the stroke; between 40 and 250 milliseconds;

speed of displacement of shaker members: between 3 and 8 meters per second;

speed gradient of shaker members: between 250 and 1500 meters per square second.

It will be noted that the diagram of motion A of the shaker members has approximately the shape of a rectangular wave. A number of different actuating devices of the hydraulic, electromagnetic or solely mechanical type already exist for obtaining a movement of this type. However, a convenient solution which has been employed experimentally by the present Applicants consists in making use of double-acting hydraulic jacks for the purpose of actuating the shaker members.

Figure 2:
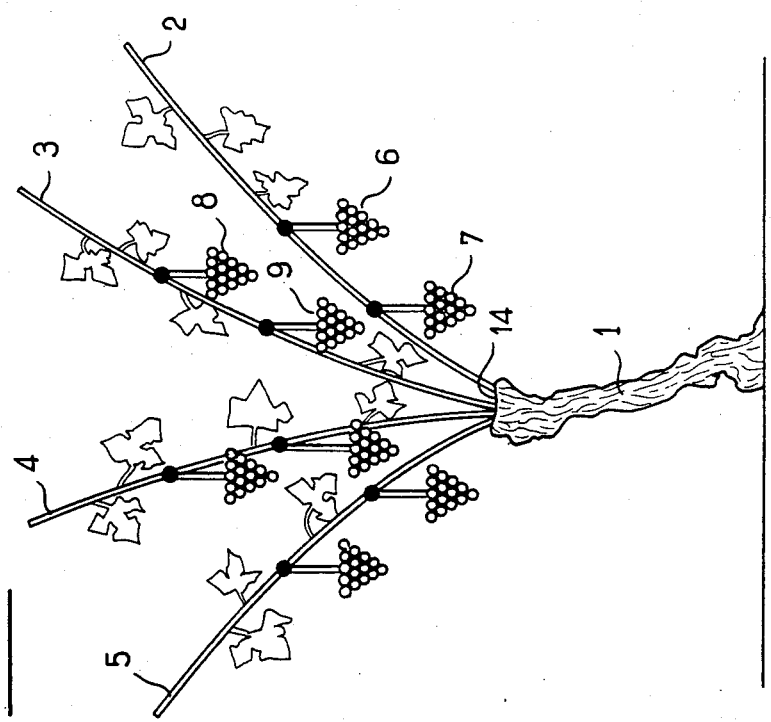
FIG. 2 is a schematic diagram of a grapevine.

The way in which bunches or so-called grape custers are detached from vine-branches or vine-shoots will now be described. FIG. 2 shows a vine of the vase-formed type comprising a trunk or stock 1 and a certain number of vine-shoots or branches 2, 3, 4 and 5 which carry grape clusters 6, 7, 8, 9, . . . . In order to simplify the following demonstration, it will be assumed that the vine has only one vine-shoot 2 and only one grape cluster 6 (as shown in FIG. 3a). It will further be assumed that the stock or trunk 1, the lower end of which is imbedded in the soil, has a stiffness $R_1$ in the transverse direction (flexural strength), and that the vine-shoot 2 is embedded at its lower end in the stock or trunk 1, has a stiffness $R_2$ in the transverse direction which is lower than that of the trunk 1, and is inclined at an angle $\alpha_0$ with respect to the latter when the vine is in its "rest" position. It will further be assumed that the mass m of the grape cluster 6 is concentrated at a point located at the extremity of a pendulum 10 having a length l and attached to the vine-shoot 2 at a point 11, an angle $\beta_0$ being made between the pendulum and the vine-shoot. It will be assumed in addition that the shaker members 12 and 13 are so arranged as to produce action on the trunk 1 of the vine in the upper portion of the trunk, but below the stock crown 14 (FIGS. 2 and 3a) and therefore below the fruit-bearing zone of the vine.

Under the effect of a high-speed horizontal displacement of the shaker members 12 and 13 (stage I of FIG. 1) towards the right, for example, the trunk 1 of the vine undergoes deformation in much the same manner as an elastic beam fixed in the ground, as shown in FIG. 3b. By reason of the low degree of stiffness $R_2$ of the vine-shoot 2, a movement cannot be instantaneously imparted by the vine-shoot to the mass m of the grape cluster 6. The cluster therefore remains approximately in its previous position of equilibrium. At this moment, the vine-shoot 2 is in position 2a and is inclined with respect to the trunk 1 at an angle $\alpha_1$ which is smaller than the $\alpha_0$ and the pendulum 10 which is now in position 10a is inclined to the vine-shoot 2a at an angle $\beta_1$ which is smaller than the angle $\beta_0$. Since the pendulum 10 has lost its position of equilibrium as a result of displacement of its point of attachment 11 to 11a, a movement of rotation of the pendulum will accordingly begin in the anticlockwise direction, which will result in an increase in the angle $\beta_1$. During the same period of time, the stiffness $R_2$ of the vine-shoot 2 will produce a rotation of the latter by bending it towards the right so that the angle $\alpha_1$ is restored to the value of equilibrium $\alpha_1$ which will be overstepped during stage III of FIG. 1 and after the abrupt deceleration stage II by reason of the kinetic energy stored in the vine-shoot 2 and in the grape cluster 6. As a result of the two combined movements on the one hand of the vine-shoot 2 and on the other hand of the pendulum 10, the vine-shoot finally occupies a position 2b on the far right is which it is inclined to the trunk 1 at an angle $\beta_2$ of higher value than $\alpha_0$ whilst the pendulum occupies a position 10b in which it is inclined to the vine-shoot 2 at an angle $\beta_2$ of higher value than $\beta_0$ by virture of the kinetic energy stored in the vine-shoot and in the cluster during their movement from position 2a to position 2b and from position 10a to position 10b, respectively, and by virtue of the abrupt deceleration and the stationary period at the end of the stroke of the shaker members 12 and 13 (stages II and III of FIG. 1). The vine-shoot and the pendulum occupy respectively the positions 2b and 10b at the end of stage III of FIG. 1. In these positions, the general stiffness of the system under the action of a horizontal force is of maximum value since the vine-shoot and the pendulum are practically horizontal. If at this precise moment (instant $t_3$), the shaker members 12 and 13 are subjected to a rapid displacement to the left (stages IV and V of FIG. 1) from the position occupied by said shaker members in FIG. 3b during stage III to the position illustrated in FIG. 3c and corresponding to stage VII in FIG. 1, the accleration of the shaker members 12 and 13 will be instantaneously and practically entirely transmitted to the mass m of the cluster 6 by reason of the horizontal stiffness of the system. The pendulum 10 (that is to say the stem of the grape cluster or bunch 6) will therefore be subjected to a substantial tractive force which will result in rupture of the stem if this force is of greater magnitude than the abscission force of the grape-cluster stem. Should rupture of the cluster stem not take place at this moment, the assembly formed by the trunk 1, the vine-shoot 2 and the pendulum 10 will begin to move towards the left under the action of the rapid displacement of the shaker members 12 and 13. During this displacement, the trunk 1 will undergo a transition from the position shown in FIG. 3b to the position shown in FIG. 3c, and the vine-shoot 2 and the cluster 6 will move towards the left while acquiring high kinetic energy as a result of the high speed of displacement. Under the action of the kinetic energy acquired by the vine-shoot and the cluster, they will reach an end position on the far left as shown at 2c and 6c in FIG. 3c. In this position, the vine-shoot 2 and the pendulum 10 are nearly horizontal and therefore have a satisfactory degree of stiffness in the horizontal direction. At this moment, the shaker members 12 and 13 have already come to a standstill since their speed of travel is higher than that of the foliage and branches. In the extreme left position of the vine-shoot and of the cluster, the deceleration can be of greater magnitude than the acceleration to which they had been subjected during stage IV of FIG. 1 since a slowing-down action is taking place and it is only necessary to absorb the energy of the masses in motion. In consequence, in position 10c, the stem of the grape cluster is subjected to a tractive force of higher value than the force to which it had been subjected in position 10b and rupture of the stem will take place if it had not already occurred in position 10b. If rupture of the grape-cluster stem has still not taken place in position 10c, it will be noted that, immediately after the end of stage VII of FIG. 1, or in other words at the instant $t_7$, when the vine-shoot and grape cluster still occupy approximately the extreme left position shown in FIG. 3c, the shaker members 12 and 13 are moved rapidly towards the right (stages VIII and IX of FIG. 1) and the grape-cluster stem will again be subjected to a sharp acceleration, therefore to a tractive force of high value which is capable of producing failure of the stem while it is still in position 10c, then again to a sharp deceleration and therefore to a large tractive force which is capable of causing stem rupture if it has not already occurred, when the vine-shoot and cluster again reach the extreme right-hand position shown in FIG. 3b.

In the event that the stems of the grape clusters are particularly strong, a few back-and-forth movements of the shaker members may prove necessary in order to obtain detachment of the clusters. Nevertheless, experiments performed by the present Applicants have shown that, by means of the method of the present invention, it is possible to detach most of the clusters in one or two back-and-forth displacements of the shaker members.

In short, it will be noted that the movement of the shaker members is a non-continuous reciprocating movement with rapid displacements and stationary periods. The movement of the shaker members after a stationary period must always be initiated when the horizontal stiffness of the vine-shoots and grape-cluster stems is of maximum value. The length of time during which the shaker members remain stationary is of primary importance for allowing sufficient time for the vine-shoots and grape-cluster stems to take up a horizontal position in either or both of the two end positions of the shaker members and for ensuring that the cluster stems are subjected to a sharp horizontal acceleration or deceleration when the cluster stems themselves are in a horizontal position. The value of acceleration or of deceleration when the cluster stems themselves are in a horizontal position. the value of acceleration or of deceleration is also of capital importance for producing a clean break in the stems of grape clusters at either of the two ends of travel of the shaker members. The rate of displacement of said shaker members is also a key factor for imparting a high value of kinetic energy to the system as a whole and thus facilitating rupture of the grape-cluster stems at either of the two ends of travel of the shaker members. It will be noted that the method of the present invention makes is possible to subject the grape clusters to sharp acceleration and/or deceleration at one or both ends of travel of the shaker members and that said acceleration and/or deceleration is capable of producing detachment of whole grape clusters by stem rupture in a very short period of time, thus removing fatigue phenomena which were conducive to detachment of individual grape berries in known machines of the prior art.

It will be understood that the embodiment of the present invention has been described in the foregoing solely by way of example without any limitation being implied. Accordingly, a large number of modifications may readily be made by those versed in the art without thereby departing either from the scope or the spirit of the present invention.

What is claimed is:

1. A method for harvesting fruits, berries and the like, in particular for gathering grapes in whole bunches, comprising: shaking a plant bearing said fruits, berries and the like by means of shaker members which encompass the plant, by reciprocating the shaker members between two end positions on each side of a mean position, and by subjecting the shaker members at least on one side of said mean position to a succession of motion stages, said motion stages comprising a high-speed motion stage, a practically zero-speed motion stage in at least one of the two end positions of the shaker members and, between said two motion stages, an intermediate motion stage having a high speed gradient, the speed in the high-speed motion stage being at least equal to 2 meters per second, the duration of the practically zero speed stage being at least equal to 30 milliseconds and the speed gradient in the intermediate stage being at least equal to 200 meters per square second.

2. A method according to claim 1, wherein the intermediate stage is an acceleration stage which precedes the high-speed stage.

3. A method according to claim 1, wherein the high-speed stage precedes the intermediate stage which is a deceleration stage.

4. A method according to claim 1, wherein said succession of motion stages comprises in sequence a high-speed stage, a deceleration stage having a high speed gradient, a practically zero speed stage in said end position, an acceleration stage having a high speed gradient and a high-speed stage.

5. A method according to claim 1, wherein said succession of stages takes place on both sides of the mean position of the shaker members.

6. A method according to claim 1, wherein the speed in the high-speed stage is within the range of 3 to 8 m/s, the speed gradient in said intermediate stage is within the range of 250 to 1500 m/s$^2$ and the time-duration of the practically zero speed stage is within the range of 40 to 250 ms.

7. A method according to claim 6, wherein the speed in the high-speed stage is equal to approximately 5 m/s, the speed gradient in the intermediate stage is equal to approximately 1000 m/s$^2$ and the time-duration of the practically zero speed stage is equal to approximately 100 ms.

8. A method according to claim 1, wherein said method consists in causing the shaker members to produce action solely on the trunks of the plants.

* * * * *